Oct. 16, 1956 G. SCHWESINGER 2,766,658
VARIABLE FOCAL LENGTH FOCUSING LENS SYSTEM
AND DEVICE THEREFOR
Filed May 20, 1955

INVENTOR.
GERHARD SCHWESINGER
BY
Harry M. Saragovitz
ATTORNEY

United States Patent Office 2,766,658
Patented Oct. 16, 1956

2,766,658

VARIABLE FOCAL LENGTH FOCUSING LENS SYSTEM AND DEVICE THEREFOR

Gerhard Schwesinger, Heidenheim (Brenz), Germany, assignor to the United States of America as represented by the Secretary of the Army Application May 20, 1955, Serial No. 510,062

6 Claims. (Cl. 88—57)

(Granted under Title 35, U. S. Code (1952), sec. 266)

The invention described herein may be manufactured and used by and for the Government for governmental purposes without payment to me of any royalty thereon.

This invention relates to a variable focal length lens system suitable for photographic purposes. More particularly, it relates to a variable focal length lens system in which a focusing device controls a pair of negative lenses movably positioned between a pair of positive lenses.

In a variable focal length lens system comprising two negative lenses movable between two fixed positive lenses, it is necessary to move the two negative lenses at different rates for maintaining a fixed focus. If one of the negative lenses is moved in any manner whatever, the motion of the other negative lens must be controlled in a predetermined relation to that of the first.

It is an object of this invention to provide a variable focal length lens system in which the movement of the negative lenses is controlled by a focusing device in such manner that the midpoint between the negative lenses is moved uniformly relative to the positive lenses while simultaneously varying the separative distance between each negative lens and the said midpoint.

It is a further object of this invention to provide an improved focusing device comprising a pair of identical cam surfaces, each cam surface controlling a different one of a pair of negative lenses.

It is a further object of this invention to provide a simple, reliable and inexpensive focusing device comprising a cylindrical member, each end face of which lies in a plane at an angle to the axis thereof, whereby each end face defines a cam surface.

Figure 1:
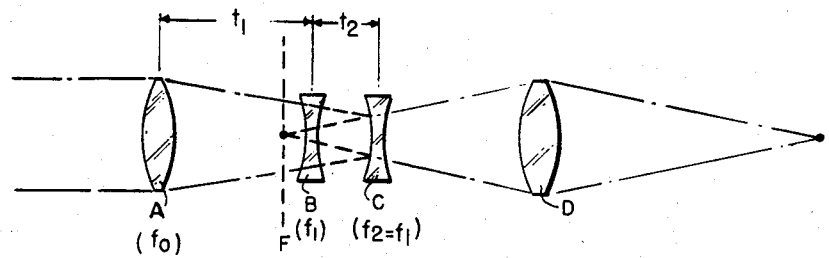
Figure 2:
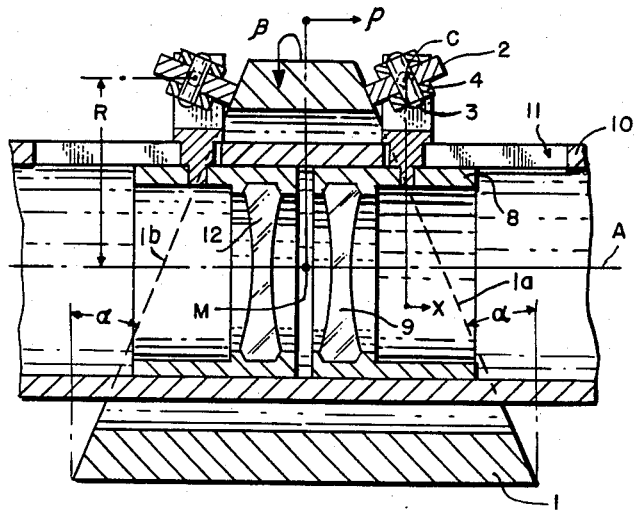
Figure 3:
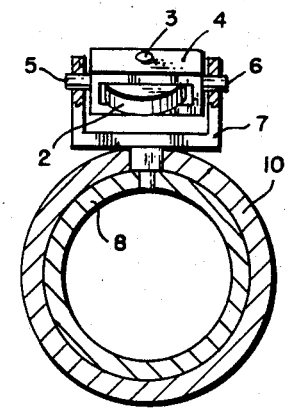
Figure 4:
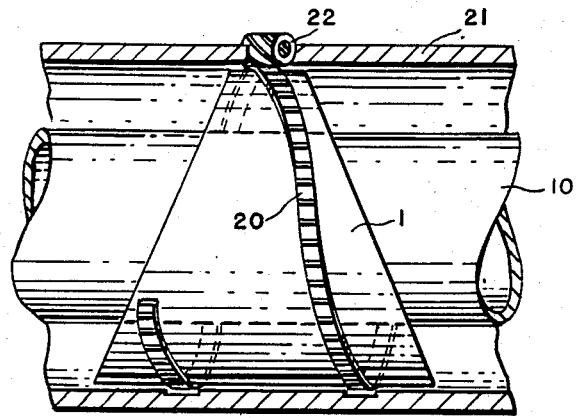

The novel features of the invention are set forth with particularity in the appended claims. The invention itself, however, will be better understood by reference to the following description read in connection with the accompanying drawing, in which:

Figure 1 is a graphical illustration of a variable focal length lens system;

Figure 2 discloses, partly in section, a focusing device in accordance with this invention;

Figure 3 is another view, partly in cross-section, of a portion of the focusing device of Figure 2;

Figure 4 discloses a means for imparting rotational and axial movement to a pair of cam surfaces in accordance with this invention.

Figure 1 discloses a variable focal length lens system wherein two negative lenses B and C are movable between two fixed positive lenses A and D. In order to maintain a fixed focus, it is necessary to move the two negative lenses at different rates. If one of the negative lenses, for example lens B, is moved in any manner whatever, the motion of the second negative lens C must be controlled in relation to that of the first lens B so as to maintain the fixed focus F. Usually, therefore, some kind of cam mechanism is provided, regardless of whether the first or second negative lens is given the primary independent motion, for example, by means of a multiple thread.

Positive lens A is assumed to have a focal length $f_0$. Negative lenses B and C are assumed to have equal focal lengths $f_1$, i. e. $f_2 = f_1$. The focal length ratio $f_0/f_1$ is denoted by $m$, the latter being a negative quantity. The spaces between lenses A, B and C are denoted $t_1$ and $t_2$, as shown in Fig. 1. Upon expressing all length dimensions in units of the front focal length $f_0$, $$\tau_1 = \frac{t_1}{f_0}; \quad \tau_2 = \frac{t_2}{f_0}$$

and $$T = \tau_1 + \tau_2$$

With the obvious restrictions of the space $t_2$ being zero as a minimum, the condition for a fixed intermediate focus F, as shown in Fig. 1, is:

$$m(mT-m-1)\tau_1^2 + (-m^2T^2+2mT+m^2-2)\tau_1 +$$
$$m(m+1)T^2 - (m^2+4m+2)T + \frac{2}{m}(m+1)^2 = 0 \quad (1)$$

The equivalent focal length of the front system (comprising lenses A, B and C) is:

$$f = \frac{f_0}{1+2m-2m\tau_1-m(m+1)(T-\tau_1)+m^2\tau_1^2(T-\tau_1)} \quad (2)$$

It can be shown that the functional relationship expressed by Equation 1 is unsymmetrical with respect to both variables $\tau_1$ and $T$. Further, regardless of which variable is taken as independent, the rate of change of focal length is highly variable throughout the focusing range. In this type of system, the first negative lens B may be controlled by a multiple thread to vary $t_1$. The second negative lens C is then spaced from the first by means of a cam, thereby varying $t_2$.

In the variable focal length lens system of this invention, the primary motion is imparted in such manner that the midpoint between the two negative lenses is moved uniformly while simultaneously varying the separative distances between the two lenses and the midpoint by equal amounts. As a result, therefore, a pair of identical cams may be utilized whereby the mechanical design may be simplified.

Referring now to Figure 2 of the drawing, let the primary motion, denoted by $\rho$, be the arithmetical mean of $\tau_1$ and $T$ so that, with the inclusion of an additional constant displacement $-(m+1)/m$, it may be defined as:

$$\rho = \frac{1}{2}(\tau_1+T) - \frac{m+1}{m} = \tau_1 + \frac{1}{2}\tau_2 - \frac{m+1}{m} \quad (3)$$

Relative to the primary displacement $\rho$, the two negative lenses are moved by an equal amount, namely, $\pm\frac{1}{2}\tau_2$, so that identical cams may be provided. The relation between $\tau_2$ and $\rho$ is given by:

$$\tau_2^3 - \frac{2}{m}\tau_2^2 + 4\left(\frac{1}{m^2}-\rho^2\right)\tau_2 + \frac{8}{m}\rho^2 = 0 \quad (4)$$

Since only the square of the independent variable $\rho$ is involved, the focusing curve becomes symmetrical. Moreover, the rate of change of focal length is much less variable than before.

Figs. 2–4 disclose an embodiment of the focusing device, it being understood that the figures are not to scale but drawn for clarity of illustration.

Referring now to Figures 2 and 3, end face $1a$ of cylinder 1 lies in a plane at an angle $\alpha$ to the axis A thereof. A roller 2, held in contact with end face $1a$ by means of a spring (not shown) is mounted on axle 3 supported in a frame 4. Frame 4 is tiltably mounted in a fork 7 by means of pins 5 and 6. The fork 7 is attached to lens carrier 8 which carries a negative lens 9 corresponding to negative lens C of Figure 1. The lens carrier 8 is slidably positioned within fixed cylinder 10 whose axis coincides with axis A. A slot 11 permits movement of fork 7 longitudinally of cylinder 10. An identical arrangement is provided for negative lens 12, corresponding to negative lens B of Figure 1.

End faces 1a and 1b define two identical cam surfaces which, when rotated through an angle $\beta$, will vary the separative distances between the midpoint M and lenses 9 and 12 by an equal amount through the action of the cam followers comprising rollers 2. In accordance with this invention, the midpoint M is moved uniformly along axis A while cylinder 1 is being rotated.

Figure 4 discloses a means for imparting to cylinder 1 an axial shift $\rho$ (Fig. 2) relative to fixed cylinder 10 and simultaneously therewith a rotational movement through an angle $\beta$ (Fig. 2). The cylinder 1 is provided with an external screw thread 20 screw-threaded into engagement with the stationary sleeve 21. Screw thread 20 has external gear teeth which engage with worm gear 22. Upon rotating worm gear 22 by any suitable means, cylinder 1 is simultaneously rotated and shifted axially relative to cylinder 10. Each roller 2 (Figs. 2 and 3), in contact with its corresponding cam surface 1a or 1b, is shifted axially, adjusting its inclination so as to maintain line contact with its cam surface. The center C of roller 2 is shifted axially by the amount $$X = A(1 - \cos \beta) \text{ where } A = R \tan \alpha \text{ and } \beta = B\rho$$

With a suitable choice of the parameters A and B, the focusing motion X (Fig. 2) approximates closely the required amount $\frac{1}{2}\tau_2$ as determined from the exact relation defined by Formula 4.

The table below was computed for the following fixed values:

$$m = -1.8$$
$$A = 0.3745$$
$$B = 179.2°$$
$$f_0 = 50 \text{ mm.}$$

| $\rho$ | X | $\tau_2$ | $X - \frac{1}{2}\tau_2$ | $(X - \frac{1}{2}\tau_2)f_0$ | $f/f$ $\rho<0$ | $f/f$ $\rho>0$ |
|---|---|---|---|---|---|---|
| 0 | 0 | 0 | 0 | 0 | −1.000 | |
| ±0.075 | 0.01027 | 0.02024 | 0.00015 | 7.5 | −0.762 | −1.312 |
| ±0.150 | 0.04046 | 0.08060 | 0.00016 | 8 | 0.577 | 1.735 |
| ±0.225 | 0.08896 | 0.17830 | −0.00019 | −9.5 | 0.433 | 2.312 |
| ±0.2955 | 0.14897 | 0.29770 | 0.00012 | 6 | 0.330 | 3.029 |

The total focal length variation is seen to be 3.029/0.330=9.18. Despite this wide range, the simple focusing mechanism of this invention does not exhibit focus errors greater than 10 microns at a front focal length $f_0$ of 50 mm.

The focusing device of this invention does not require an expensive cam, is simple, reliable and practically free of wear since a roller is used as a contact member between the focusing cylinder 1 and the lens to be focused.

While the invention has been described with reference to the structures shown, it is not restricted to the details herein disclosed and this application is intended to cover such modifications or departures as may come within the scope of the appended claims. For example, although single element lenses have been illustrated, lenses comprising a plurality of elements are within the scope of this invention. Again, for example, the means disclosed in Figure 4 is merely illustrative. Any arrangement which provides inter-engagement between cylinders 1 and 10, for example, a thread or cam groove in one member and a coacting mating thread or projection from the other member, may be substituted to provide the desired coordination.

What is claimed is:

1. In a device for focusing a variable focal length lens system which comprises a pair of positive lenses and a pair of negative lenses enclosed by said positive lenses, a first cylindrical member, a pair of carriers for said lenses slidably positioned within said first cylindrical member, a second cylindrical member rotatable about and axially movable along said first cylindrical member, each end face of said second cylindrical member lying in a plane at an angle to the axis of said first cylindrical member; and follower means attached to each of said carriers and resiliently engaging an end face of said second cylindrical member.

2. In a device for focusing a variable focal length lens system which comprises a pair of positive lenses and a pair of negative lenses enclosed by said positive lenses, a first cylindrical member, a pair of carriers for said lenses slidably positioned within said first member, a second cylindrical member disposed about said first member, each end face of said second member lying in a plane at an angle to the axis thereof, each of said end faces defining a cam surface, means for rotating said second member and simultaneously effecting axial movement thereof relative to said first member and a pair of cam rider means each attached to a different one of said carriers and each resiliently engaging a different one of said cam surfaces.

3. A variable focal length lens system comprising, a first member having an axis, a pair of positive lenses fixedly spaced along said axis, a pair of negative lenses, carriers for said negative lenses slidably movable along said axis, a pair of substantially identical cam surfaces, each having an axis of symmetry lying along said axis of said first member, means for simultaneously rotating said cam surfaces while effecting movement thereof axially relative to said first member and a cam rider means attached to each of said lens carriers and resiliently engaging one of said cam surfaces.

4. Apparatus as defined in claim 3 wherein said pair of cam surfaces comprises a second cylindrical member, each end face of which lies in a plane at an angle to said axis of symmetry.

5. Apparatus as defined in claim 4 wherein each of said cam rider means comprises a roller engaging one of said end faces.

6. A variable focal length lens system comprising a pair of positive lenses spaced along a common optical axis, a pair of negative lenses enclosed by said positive lenses and slidably movable along said common optical axis, a pair of substantially identical cam surfaces, each having an axis of symmetry lying along said common optical axis, means for simultaneously rotating said cam surfaces about said common optical axis while effecting movement thereof along said common optical axis relative to said positive lenses and means controlled by said cam surfaces for effecting simultaneous axial movement of said negative lenses relative to said positive lenses and relative to each other.

References Cited in the file of this patent

UNITED STATES PATENTS

| 2,514,239 | Hopkins | July 4, 1950 |
| 2,566,485 | Cuvillier | Sept. 4, 1951 |
| 2,566,889 | Hopkins | Sept. 4, 1951 |
| 2,649,025 | Cook | Aug. 18, 1953 |
| 2,663,223 | Hopkins | Dec. 22, 1953 |

FOREIGN PATENTS

| 597,354 | Germany | May 25, 1934 |
| 1,080,099 | France | May 26, 1954 |